United States Patent
Scholvinck et al.

(10) Patent No.: US 9,167,935 B2
(45) Date of Patent: Oct. 27, 2015

(54) MIXED BEVERAGE PREPARATION AND DISPENSING

(75) Inventors: Michiel Olivier Scholvinck, Arnhem (NL); Edouard Sterngold, Viterbo (IT)

(73) Assignee: MDS GLOBAL HOLDING PLC, Sliema (MT)

( * ) Notice: Subject to any disclaimer, the term of this patent is extended or adjusted under 35 U.S.C. 154(b) by 0 days.

(21) Appl. No.: 13/809,980

(22) PCT Filed: Jul. 14, 2010

(86) PCT No.: PCT/NL2010/050455
§ 371 (c)(1),
(2), (4) Date: Mar. 11, 2013

(87) PCT Pub. No.: WO2012/008825
PCT Pub. Date: Jan. 19, 2012

(65) Prior Publication Data
US 2013/0171320 A1     Jul. 4, 2013

(51) Int. Cl.
*A47J 31/40* (2006.01)
*B67D 1/00* (2006.01)
(Continued)

(52) U.S. Cl.
CPC .............. *A47J 31/402* (2013.01); *A47J 31/407* (2013.01); *B67D 1/0001* (2013.01); *B67D 1/0022* (2013.01); *B67D 1/0051* (2013.01); *B67D 1/0078* (2013.01); *B67D 1/0882* (2013.01); *B67D 1/0888* (2013.01); *B67D 1/1272* (2013.01); *B67D 1/1275* (2013.01); *B67D 3/0006* (2013.01); *B67D 2001/0811* (2013.01)

(58) Field of Classification Search
CPC ...... A47J 31/40; A47J 31/402; B67D 1/1275; B67D 1/1272; B67D 1/0001; B67D 1/0022; B67D 1/0051; B67D 1/0078; B67D 1/0888; B67D 3/0006; B67D 2001/0811
USPC .................... 222/129.1–129.4, 146.1, 52, 63; 99/280, 290, 295
See application file for complete search history.

(56) References Cited

U.S. PATENT DOCUMENTS 2,462,019 A * 2/1949 Bowman ........................... 222/1
2,712,887 A * 7/1955 King .............................. 222/132
(Continued)

FOREIGN PATENT DOCUMENTS

DE    10 2006 002 511 A1    7/2007
GB       2 019 813 A         11/1979
(Continued)

OTHER PUBLICATIONS

International Search Report for PCT/NL2010/050455 dated Sep. 15, 2011.
(Continued)

*Primary Examiner* — Lien Ngo
(74) *Attorney, Agent, or Firm* — Wolf, Greenfield & Sacks, P.C.

(57) ABSTRACT

A water dispensing device comprises water dispensing means for dispensing water into a serving container. The device furthermore comprises a control unit which is connected with the water dispensing means to control a water dispensing cycle in which a predetermined amount of water is dispensed in the serving container. The control unit is programmed such that the water dispensing cycle includes at least two stages which are separated by an intermediate time period in which no water is dispensed in the serving container.

17 Claims, 2 Drawing Sheets

(51) Int. Cl.
*B67D 1/08* (2006.01)
*B67D 1/12* (2006.01)
*B67D 3/00* (2006.01)

(56) References Cited

U.S. PATENT DOCUMENTS

| | | | |
|---|---|---|---|
| 3,777,937 A * | 12/1973 | Buck | 222/641 |
| 4,068,781 A * | 1/1978 | Toth | 222/52 |
| 4,211,342 A * | 7/1980 | Jamgochian et al. | 222/129.4 |
| 4,388,338 A | 6/1983 | Wittenborg | |
| 4,649,809 A * | 3/1987 | Kanezashi | 99/290 |
| 4,903,585 A | 2/1990 | Wimmers et al. | |
| 5,673,820 A * | 10/1997 | Green et al. | 222/129.3 |
| 6,669,053 B1 * | 12/2003 | Garson et al. | 222/61 |
| 7,798,054 B2 * | 9/2010 | Evers et al. | 99/295 |
| 7,976,883 B2 * | 7/2011 | Guerrero et al. | 426/232 |
| 7,997,448 B1 * | 8/2011 | Leyva | 222/129.1 |
| 2004/0071841 A1 * | 4/2004 | Carhuff et al. | 426/250 |
| 2006/0115572 A1 * | 6/2006 | Guerrero et al. | 426/597 |
| 2006/0131336 A1 | 6/2006 | Schroeder et al. | |

FOREIGN PATENT DOCUMENTS

| | | |
|---|---|---|
| GB | 2 374 856 A | 10/2002 |
| JP | H0245936 A | 2/1990 |
| JP | 2004-70513 A | 3/2004 |
| JP | 2007-513838 A | 5/2007 |
| JP | 2007525385 A | 9/2007 |
| WO | 2005/077811 A2 | 8/2005 |
| WO | 2007/080532 A1 | 7/2007 |

OTHER PUBLICATIONS

Communication dated Jul. 9, 2014, issued by the Russian Patent Office in counterpart Application No. 2013103533/12.
Office Action dated Mar. 3, 2015 from corresponding Japanese Patent Application No. 519615/2013.

* cited by examiner

MIXED BEVERAGE PREPARATION AND DISPENSING

BACKGROUND OF THE INVENTION

The present invention relates to beverage dispensing. In particular it relates to a method and system wherein a beverage preparation substance is mixed with water to prepare a beverage. An example is where a syrup is post mixed with carbonated water to prepare a soft drink. Another example is where a coffee concentrate is mixed with hot water to prepare a cup of coffee.

In preparation of post-mix beverages a concentrate is dispensed into a serving container and water is jetted into the serving container. The substance and the water can be dispensed consecutively, but may also be dispensed, at least partly, simultaneously to obtain a good mixing of the water and the substance. When mixing the water with the substance, a certain amount of foaming takes place, depending on the substance used, the flow speed of the water, carbonation level and temperature of the water. This foaming may be undesirable as is the case with soft drinks. In other cases the foaming may be desirable and used to create a froth layer on top of the drink.

The present invention has for an object to provide a device and a method with which different beverages can be prepared.

SUMMARY OF THE INVENTION

This object is achieved by a water dispensing device comprising water dispensing means for dispensing water into a serving container, and comprising a control unit which is connected with the water dispensing means to control a water dispensing cycle in which a predetermined amount of water is dispensed in the serving container, wherein said control unit is programmed such that the water dispensing cycle includes at least two stages which are separated by an intermediate time period in which no water is dispensed in the serving container.

Having one or more stages, possibly including one or more pauses between two water dispensing stages, is used e.g. to control unwanted foaming, optimize the carbonation level of the beverage, or optimize the froth layer on top of a beverage.

Preferably, the water dispensing means comprises one or more coupling means for coupling the device to a hot water source, a cold water source, an ambient temperature water source and/or a carbonated water source and wherein the water dispensing means comprises a valve assembly and/or a pump assembly for effecting the transportation of the selected water source(s) to the serving container.

In a preferred embodiment the water dispensing device furthermore comprises an input device which is connected with the control unit, which input device in use generates an input signal for the control unit to activate the water dispensing cycle.

The input device may comprise an identification recognition device, e.g. for recognizing the identification of a container containing a flavouring substance. The identification may e.g. be a physical feature, such as an indentation or protrusion, or a code, such as a bar code, or a chip. Thus, the identification recognition device is preferably suitable to recognize such identification, and e.g. comprises automatic and/or mechanical recognition means, or a bar code reader or another type of scanner.

The input device may comprise a manual operation means, e.g. a key pad, a push button assembly or another suitable operation means, which allows the user to provide the input manually to the control unit.

The control unit is preferably programmed such that in different stages of a water dispensing cycle, different water sources may be selected.

In a possible embodiment the control unit is programmed such that the water dispensing cycle includes two stages, preferably separated by an intermediate period. For example, in the first stage of the water dispensing cycle carbonated water is dispensed and in the following stage(s) of the water dispensing cycle cold water is dispensed, or vice versa. Such a two stage cycle is in particular advantageous when the carbonated water amounts up to 30-50% of the water content of the beverage.

Possibly, the control unit is programmed such that the carbonated water is dispensed in two or more stages, preferably two stages, separated by an intermediate period. This is an advantageous program when the beverage to be prepared contains a large amount of carbonated water, e.g. over 30%, or over 40%, or over 50%.

In a possible embodiment, the control unit is programmed such that the water dispensing cycle includes three stages which are separated by one or two intermediate time periods in which no water is dispensed in the serving container.

Preferably, the intermediate time period between the first and second stage in the water dispensing cycle is approximately twice the length of the intermediate time period between the second and third stage in the water dispensing cycle.

Alternatively, for example, in the first stage of the water dispensing cycle carbonated water is dispensed, followed by an intermediate period, after which cold water is dispensed and then, without a pause, an additional amount of carbonated water is dispensed in the third stage.

In a possible embodiment, a memory device is provided, connected to the control unit, in which a number of water dispensing cycles are stored, and wherein the control unit is programmed to select one of the cycles based on an input signal.

The above described water dispensing device can be applied in a beverage preparation system comprising an apparatus including a water dispensing device as described and furthermore comprising a container containing a flavouring substance, e.g. a concentrate or syrup.

The apparatus includes flavouring substance dispensing means for effecting the dispensing of said substance from the container into the serving cup.

The flavouring substance dispensing means are connected to the control unit, which control unit is programmed to control the dispensing of the substance into the serving cup.

The control unit may be programmed to effect the dispensing of the substance in the serving cup and effect the dispensing of the water in the serving cup so as to mix the water with the substance.

The container may be a single portion container, e.g. a capsule or a pouch, which contains flavouring substance for one portion of a certain beverage.

The container may also is a multiple portion container which contains flavouring substance for multiple portions of a beverage.

The single portion container containing a flavouring substance may be provided with an identification means, which allows for identification of the container and thereby its content by the identification recognition device. The identification means may e.g. be a physical feature, such as an indentation or protrusion, or a code, such as a bar code, or a chip. It is noted that the identified data to be identified by the identification recognition device may include very specific information such as the production date and exact composition of the substance, but alternatively may only include general information about the required water dispensing cycle. Hence, containers containing different flavouring substances, which require the same water dispensing cycle, may be provided with the same identification means to be identified by the identification recognition device.

The invention furthermore relates to a method for preparation of a beverage, which method comprises the steps of
   dispensing a flavouring substance from a container into a serving container, e.g. a cup, a glass, a jug or a bottle, and
   dispensing water from a water source into the serving container,
wherein the water and the substance are mixed in the serving container so as to form the beverage,
wherein the water is dispensed in the serving container in at least two dispensing stages, which are separated by an intermediate time period, in which no water is dispensed in the serving container.

The water dispensed may be selected from the types carbonated water or still water, which still water may be cold, hot or of ambient temperature.

The water dispensed in at least two of the dispensing stages may be from a different type.

Another aspect of the invention relates to a water dispensing device comprising water dispensing means for dispensing water into a serving cup and comprising a control unit which is connected with the water dispensing means to control a water dispensing cycle, wherein the water dispensing means comprises one or more coupling means for coupling the device to a hot water source, a cold water source, an ambient temperature water source and/or a carbonated water source, wherein the water dispensing means comprises a valve assembly and/or a pump assembly for effecting the transportation of the selected water source(s) to the serving container and wherein the control unit is programmed such that the water dispensing cycle includes at least two stages, in each of which a different water type (hot, cold, ambient temperature or carbonated) is dispensed so as to mix said water types.

This aspect of the invention also relates to a method for preparation of a beverage, which method comprises the steps of
   dispensing a flavouring substance from a container into a serving container, e.g. a cup, a glass, a jug or a bottle, and
   dispensing water from a water source into the serving container,
wherein the water and the substance are mixed in the serving container so as to form the beverage,
wherein the water is dispensed in the serving container in at least two dispensing stages, in which the water dispensed is selected from the types carbonated water or still water, which still water may be cold, hot or of ambient temperature, wherein the water dispensed in at least two of the dispensing stages is from a different type.

Yet another aspect of the invention relates to a beverage preparation system comprising a container containing a flavouring substance and an apparatus including a water dispensing device; wherein the container has a container body defining a filling cavity filled with the substance and wherein the container body has a circumferential flange to which a covering sheet is sealed by a circumferential sealing seam, thereby closing the filling cavity, said circumferential sealing seam comprising a predetermined rupturing zone, which—upon pressurizing the content of the container—ruptures to release a dispensing passage to allow the substance to flow out of the container; wherein the apparatus includes substance dispensing means for effecting the dispensing of said substance from the container into a serving cup, said substance dispensing means comprising compression means for compressing the container so as to pressurize its content; wherein the substance dispensing means are connected to a control unit, which control unit is programmed to control the dispensing of the substance into the serving cup, wherein the control unit is programmed to control the compression of the container such that the container is compressed in a plurality of stages which are separated by an intermediate time period in which no further compression of the container takes place such that the pressure in the container is held at the same level or is reduced during said intermediate period.

The invention will be described in more detail in the following description with reference to the drawing.

DETAILED DESCRIPTION

Figure 1:
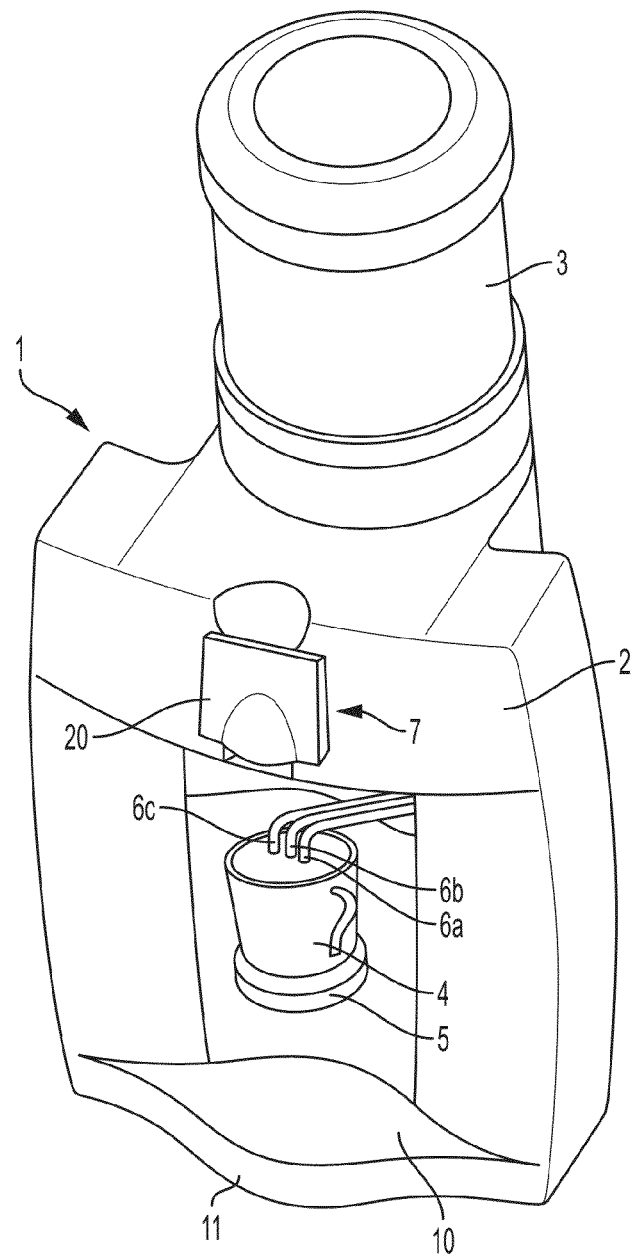
FIG. 1 shows a view in perspective of a possible embodiment of a dispensing apparatus according to the invention.
Figure 2:
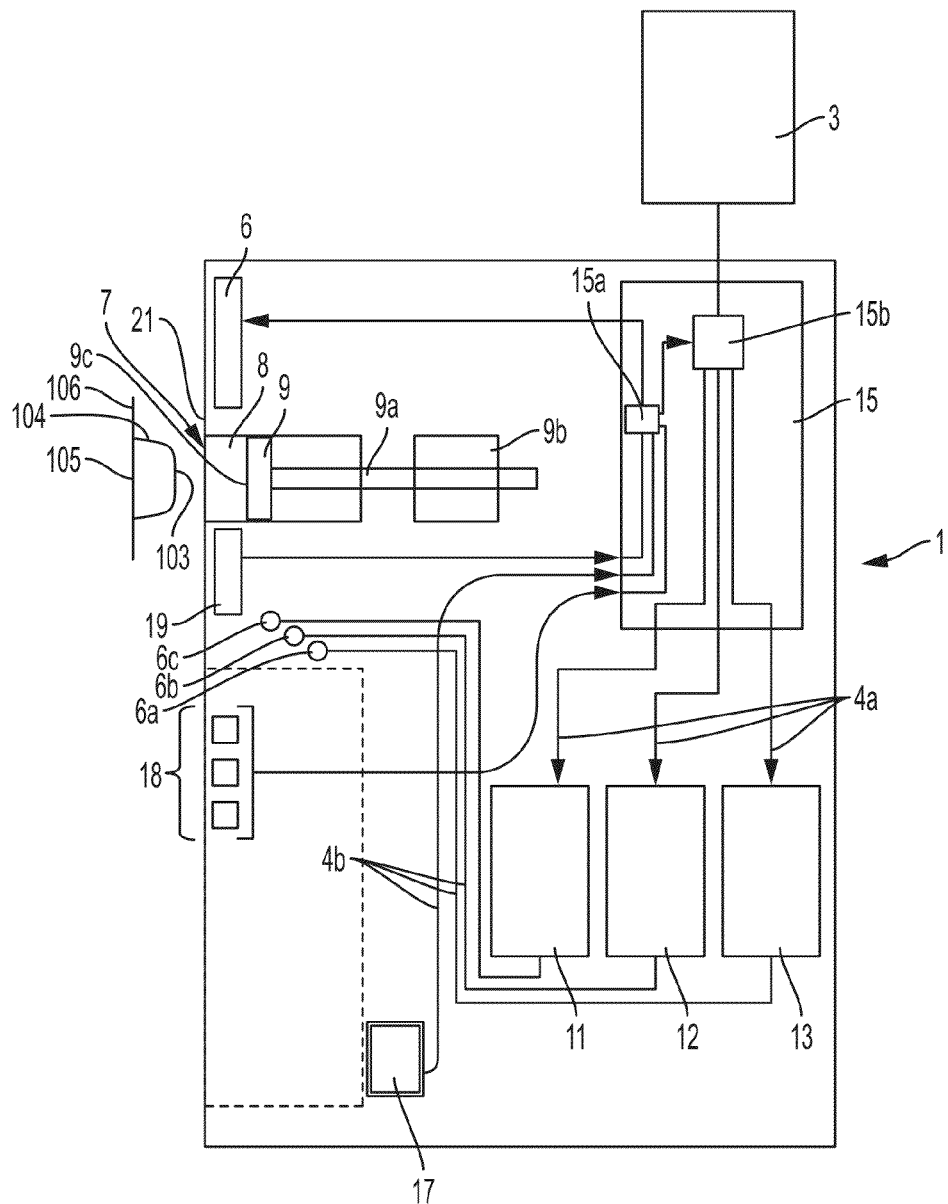
FIG. 2 shows a schematic cross section of a dispensing apparatus according to the invention.

FIGS. 1 and 2 show a beverage dispensing apparatus 1 with housing 2.

On top of the housing 2 is placed a water tank 3, for feeding water. In another embodiment it is also possible to provide the apparatus 1 with an internal water storage tank. It is also possible to connect the apparatus 1 to a water supply line. From the housing 2 is extending a platform 5 for placing a cup 4 or another serving container on which is to be filled with a beverage, such as a glass, a jug or a bottle. Above the cup 4 are arranged in this example three dispensing pipes 6a, 6b and 6c, through which can be dispensed cold water, warm water and carbonated water respectively. There could also be an additional dispensing pipe for still water with ambient temperature.

The dispensing apparatus comprises receiving means 7 for receiving a container 101 containing a flavouring substance for preparation of a beverage. The container is in this example formed as a generally cup-shaped capsule filled with a single portion of a substance, e.g. coffee concentrate, a fruit juice concentrate or syrup for a soft drink.

The generally cup-shaped container 101 has a bottom 103 and a circumferential side wall 104 adjoining the bottom 103 at one end. The bottom 103 and the side wall 104 define the filling cavity of the container 101 in which the substance is received. At the end of the side wall 104 remote from the bottom the container has a radially outwardly extending circumferential flange 106. The container 101 is closed by a covering sheet 105, e.g. a foil which is sealed to the circumferential flange 106 by means of a circumferential sealing seam. The circumferential sealing seam is provided with a predetermined rupturing zone where the circumferential sealing seam is allowed to rupture upon pressurizing the content of the container 101. By rupturing the sealing seam at the predetermined rupturing zone a passage for the concentrate is opened up to allow the substance to flow out of the container 101 and into the serving container 4.

In FIG. 2 is shown a schematic cross section of the apparatus 1. The water from the tank 3 can be directed by means of a control system 15 through feed lines 14a to a cooling system 13, a heating system 12 and a carbonating system 11, which are connected with the three dispensing pipes 6a, 6b and 6c respectively by feed lines 14b.

It is also possible to have the dispensing lines of cold water, hot water, water with ambient temperature and carbonated water all connected to one common dispensing pipe (not shown) from which the water is dispensed in the serving container.

In the shown embodiment, the receiving means 7 of the beverage dispensing apparatus 1 have a compression chamber 8 with a variable volume. The compression chamber 8 is delimited by a piston 9 which can be reciprocated by means of a motor 9b. The piston 9 is adapted to engage the bottom 103 of the container 101. In other possible embodiments (not shown) the drive means can comprise pneumatic means, hydraulic means or can be adapted to be hand driven.

Here, the receiving means 7 have a covering lid 20 which is hingedly attached to the housing 2 and can be opened (see FIG. 2) and closed (see FIG. 1). Further, the receiving means 7 have a front plate 21.

The covering lid 20 may be provided with a recess 24 which, when a container 101 is received in the receiving means, is located over the predetermined rupturing zone of the circumferential sealing seam. This allows the sealing foil to bulge out locally upon pressurization of the content of the container 101 and causes the rupturing of the predetermined rupturing zone of the sealing seam. Thereby the dispensing passage for the substance is opened up.

By further compression of the container body all the substance is dispensed into the cup 4 or another container. Then cold, warm or carbonated water can be added through the pipes 6a-6c. This can be done automatically as will be described further below. In the shown embodiment, subsequently the covering lid 20 can be opened and the container 101 can be removed from the receiving means 7. Alternatively, not shown, an automatic disposal of capsules can be provided, which are e.g. disposed in a reservoir provided in or adjacent the beverage dispensing apparatus 1.

With the present apparatus 1 in combination with the container 101 the substance is directly dispensed from the container 101 in a serving container like the cup 4, a glass, a jug, a bottle or the like. The substance is treated by mixing it in the serving container 4 with a certain amount of water. The advantage of this is that the dispensing apparatus 1 is not contaminated with the flavouring substance. Therefore, there a cross-contamination between different flavouring substances cannot occur if different beverages are prepared subsequently.

The water can be added to the serving container 4 when the substance has been dispensed in the serving container 4. It is also possible that the water is dispensed into the serving container 4 at the same time as the substance is dispensed into the serving container 4. For instance a water jet can be directed into the flow of substance coming from the container to obtain a good mixing of the substance and the water. It is also possible to dispense some water into the serving cup, and then add the substance, after which the remaining water can be added.

Preferably the dispensing apparatus 1 comprises identification recognition means for identifying the required water dispensing cycle of the container 101 and the substance therein. To this end also the container 101 preferably comprises identification means. The identification means could be visual identification means, e.g. a bar code or the like. Also electronic identification means are possible, more specifically comprising a resonance circuit or a transponder.

The identification means applied to the container 101 correspond to a specific substance contained in the container 101.

The identification recognition means could be a sensor 19 that is provided at the front plate 21 of the receiving means 67 as is shown in FIG. 2. The sensor 19 transfers the information from the identification means to the control system 15 (see FIG. 2).

The control system 15 comprises a valve and/or pump assembly 15b for directing the water flows from the water source(s) to the lines 4a and towards the dispensing lines 6a-c. The control system furthermore comprises a control unit 15a which controls the valve and/or pump assembly 15b.

The control unit 15a is programmable and may include an electronic memory in which the recipes for several beverages can be stored. Another possibility is that the identification means on the container 101 contain the information for the recipe which is then transferred to the control unit 15a.

The dispensing apparatus 1 can determine by means of the identification means and the identification recognition means what amount of water has to be added to the substance to get the right concentration for the beverage. For example, if a container 101 with concentrated coffee substance is placed in the receiving means 7 the dispensing apparatus 1 will automatically know that there has to be added a certain predetermined amount of hot water to the cup 4.

The dispensing apparatus 1 may have, in addition to or instead of automatic identification recognition means, a control panel or control buttons 18 connected to the control unit 15a. With the control panel or control buttons 18 a consumer can dispense water of his choice (hot, cooled, carbonated, ambient) in the serving container 4. The control panel 18 may for example comprise a set of selection buttons, each of which represents the preparation of a certain beverage. For example if a person wants to have orange juice he can press the button indicating "orange juice". The orange juice concentrate may be dispensed from a single portion container 101 as is described in the above, but may also be dispensed from a large container (containing multiple portions) incorporated in the machine, or from other types of single or multiple portion containers such as a pouch type container.

As is described in the above, the control unit 15a is connected with the water dispensing means to control the water dispensing. The water is dispensed in a water dispensing cycle in which a predetermined amount of water is dispensed in the serving cup 4. The control unit 15a is programmed such that the water dispensing cycle may include at least two stages which are separated by an intermediate time period in which no water is dispensed in the serving container 4.

Water types can be mixed in any combination of cold, carbonated, hot and ambient water, and in any ratio. This is e.g. defined by the identification means, such as a bar code. For practical reasons, the ratio may be set in discrete steps, e.g. of 5 or 10%. Between the two water types a first intermediate period or pause may be needed to let the foaming of the first part settle. The length of the pause is variable, depending on the type of beverage—some beverages require a longer pause than others because they are foaming more, and some require no pause at all. Typically a pause length between 0 and 9 seconds is sufficient. The required length of the pause for a certain beverage can be defined by a code on the capsule (e.g. in a barcode) or fixed in the machine (e.g. a specific button is meant of specific type of drinks). This (first) pause is typically needed when the first part is carbonated water—but you could use it also in case of still water.

In other cases no pause is needed between two dispensing stages. For example when carbonated water is dispensed to create a froth layer, in the next stage hot water may be added without a pause between the two stages. Whether a pause is needed depends on many factors like the substance properties e.g. its viscosity, the carbonation level of the water or water temperature, the desired effect on the resulting beverage.

To control the dispensing regarding foaming when carbonated water is being dispensed, generally a pause and even sometimes an extra (a second) pause is needed. This is typically required when the amount of carbonated water is more than 30% of the total amount of water.

When a large amount of carbonated water is dispensed in a second stage, this second stage is then preferably split in two parts, with a pause in between. The duration of this second pause can be shorter than the first pause because the drink is already less concentrated. Typically the second pause can be half the time of the first pause. The dispensed part of the water after this second pause is typically less than 30% of the total beverage. This is always the last part of the total dispensing process.

A few non limiting examples of dispensing cycles are:
Mixture of 100% hot water and substance: only one dispensing stage without intermediate period;
Mixture of 100% carbonated water and substance: three dispensing stages with two intermediate periods, e.g. in the ratios 30%-50%-20%, 40%-40%-20% or 60%-20%-20%.
Mixture of 70% cold water, 30% carbonated water and substance: first dispensing stage 70% cold water and second dispensing stage 30% carbonated water without intermediate period;
Mixture of 60% cold water, 40% carbonated water and substance: first dispensing stage 60% cold water and immediately thereafter, without intermediate period, the second dispensing stage 20% carbonated water, followed by an intermediate period and third dispensing stage 20% carbonated water;
Mixture of 30% carbonated water, 50% cold water and 20% carbonated water and substance: first dispensing stage 30% carbonated water, and immediately thereafter, without intermediate period, the second dispensing stage 50% cold water, and immediately thereafter, without intermediate period, third dispensing stage 20% carbonated water.

The pause between the second and third dispensing stage is preferably half of the time of the pause between the first and second dispensing stage. For instance in the last example the control unit of the water dispenser may be programmed to dispense 50% carbonated water then wait for 5 seconds, then dispense 30% carbonated water; then wait for 2.5 seconds and then dispense the last 20% of the carbonated water.

In hot or cold beverages where a frothing layer on top of the beverage is desired one can use carbonated water to provoke foaming.

Preferably, during or after the substance is dispensed in the serving container, first a 10%-40% portion of carbonated water is dispensed in the serving container and mixed with the substance, because this results in the maximum frothing effect. Next, the other water type, hot or cold can be dispensed into the serving container. The relative influence of the carbonated water on the beverages end temperature (typically for hot beverages) is minimized while the maximum frothing effect is obtained.

In case of a mixture of carbonated and cold water and if only frothing is required and a carbonation taste in the beverage is unwanted, the preferred order is also to take first carbonated water and then cold water. The second stage of the dispensing process with cold water makes sure almost all $CO_2$ is removed, while the foam layer will float on top of the drink.

The length of the pause between the two water types can additionally be used to fine-tune the frothing layer, i.e. making it a higher or lower. But there may also be no pause between the dispensing of the different water types, as was mentioned in the above.

The dispensing in two stages can also be used to obtain the desired carbonation level in the beverage. Some beverages contain 100% carbonated water, but other "light sparkling" beverages contain less carbonated water. For this type of beverages it is preferred to dispense first the cold water into the substance in the serving container and then add the carbonated water. This is because dispensing carbonated water in a partly diluted concentrate or syrup results in less foaming and $CO_2$ loss then the other way around. A better control of the carbonation level in the final result is thus obtained.

Another aspect of the invention relates to the compression of the single portion capsule by the compression means of the dispensing apparatus 1. As is described in the above the compression means are used for compressing the single portion container so as to pressurize its content. In the example shown the compression means comprise a compression chamber 8 delimited by a compression piston 9 which is adapted to reciprocate. The driving means 9b for the piston 9 are connected to the control unit 15a. The control unit 15a is programmed to control the dispensing of the flavouring substance from the capsule 101 into the serving cup 4. The control unit 15a is programmed to control the compression of the container 101 such that the container 101 is compressed in a plurality of stages by the piston 9. Said compression stages are separated by an intermediate time period in which the piston 9 is withdrawn or held in place and in which thus no progress in the compression of the container 101 takes place. The piston 9 that compresses the container 101 can push against the container 101 and go back again or stop repeatedly, each time a bit further. Thereby the predetermined rupturing zone of the sealing seam is weakened step by step without opening the seal. To finally open the seal now takes less force, resulting in a reduced speed of the dispensed substance, so reduced risk of splashing of the substance out of the serving container 4.

What is claimed is:
1. A drink dispensing device for supplying a flavored drink to a serving container, the device comprising:
a source of water of a first type selected from the group consisting of carbonated water, cold still water and still water at ambient temperature is dispensed;
a source of water of a second type selected from said group consisting of carbonated water, hot still water, cold still water and still water at ambient temperature, said second type being different from said first type;
an input device arranged to provide an input signal that includes information regarding a water dispensing cycle for use in supplying the flavored drink to the serving container; and
a dispensing controller operative to receive the input signal and supply water from source of water of said first type and said source of water of said second type to said serving container for the flavored drink according to the water dispensing cycle corresponding to the input signal, the water dispensing cycle including dispensing water from the source of water of the first type and dispensing water from the source of water of the second type in at least first and second dispensing stages.

2. The drink dispensing device according to claim 1 and wherein said dispensing controller is operative to cause said first water dispensing stage and said second water dispensing stage to be separated by a pause during which no water is dispensed into said serving container.

3. The drink dispensing device according to claim 1 and wherein said dispensing controller is also operative to supply water in a third water dispensing stage wherein water of a third type selected from said group consisting of carbonated water, hot still water, cold still water and still water at ambient temperature is dispensed, said third type being different from at least one of said first type and said second type.

4. The drink dispensing device according to claim 3 and wherein said dispensing controller is operative to cause said first water dispensing stage and said second water dispensing stage to be separated by a first pause during which no water is dispensed into said serving container.

5. The drink dispensing device according to claim 4 and wherein said dispensing controller is operative to cause said second water dispensing stage and said third water dispensing stage to be separated by a second pause during which no water is dispensed into said serving container.

6. The drink dispensing device according to claim 5 and wherein said dispensing controller is operative to cause said first pause to have a first duration and said second pause to have a second duration, said first duration being twice the length of said second duration.

7. The drink dispensing device according to claim 4 and wherein:
said first type is carbonated water, said second type is cold still water and said third type is carbonated water.

8. The drink dispensing device according to claim 4 and wherein said dispensing controller is operative to cause said second water dispensing stage and said third water dispensing stage not to be separated by a pause.

9. The drink dispensing device according to claim 5 and wherein:
said first type is carbonated water, said second type is cold still water and said third type is carbonated water; and
said carbonated water constitutes at least 30% of the water content of the flavored beverage.

10. The drink dispensing device according to claim 1 and wherein:
said first type is carbonated water and said second type is cold still water.

11. The drink dispensing device according to claim 1, wherein said input device includes an identification recognition device arranged to recognize an identification of a container containing a flavoring substance mixed with water to form the flavored drink.

12. The drink dispensing device according to claim 1, wherein said input means includes a manual operation means that allows a user to provide input manually.

13. The drink dispensing device according to claim 1, further comprising a substance dispenser to dispense a flavoring substance from a container that is mixed with water to form the flavored drink.

14. The drink dispensing device according to claim 13, wherein the substance dispenser is arranged to pressurize the flavoring substance to dispense the flavoring substance from the container.

15. The drink dispensing device according to claim 1, wherein said first type is carbonated water and said second type is hot still water.

16. The drink dispensing device according to claim 1, further comprising a substance dispenser including a piston to compress a capsule containing a flavoring substance to dispense the flavoring substance into the container.

17. The drink dispensing device according to claim 1, wherein the dispensing controller is arranged dispense water from said source of water of said first type and said source of water of said second type directly into said serving container for mixing with a flavoring substance in the serving container.

* * * * *